United States Patent
Powers

[15] 3,650,559
[45] Mar. 21, 1972

[54] WEATHER DEFLECTOR FOR AUTOMOBILE WINDSHIELD

[72] Inventor: George A. Powers, Jacksonville, Fla.
[73] Assignee: Rainshield, Inc., Jacksonville, Fla.
[22] Filed: Apr. 3, 1970
[21] Appl. No.: 25,370

[52] U.S. Cl..........................296/95 R, 24/203, 160/368 S, 248/291
[51] Int. Cl. ........................................................B60j 1/20
[58] Field of Search ..................296/95 R, 95 C; 160/368 S, 160/DIG. 3; 248/274, 284, 291 X; 24/203 X, DIG. 16

[56] References Cited

UNITED STATES PATENTS

| 3,400,750 | 9/1968 | Smarker | 296/95 X |
| 1,360,919 | 11/1920 | Garside | 296/95 |
| 2,470,477 | 5/1949 | Ellithorpe | 296/95 |
| 3,424,490 | 1/1969 | Francis | 296/95 |
| 2,566,934 | 9/1951 | Dieterich | 296/95 |
| 3,002,557 | 10/1961 | Roth et al. | 160/378 X |

FOREIGN PATENTS OR APPLICATIONS

| 272,881 | 2/1967 | Australia | 296/95 |
| 470,634 | 1/1951 | Canada | 296/95 |
| 703,805 | 2/1965 | Canada | 296/95 |

Primary Examiner—Benjamin Hersh
Assistant Examiner—Leslie J. Paperner
Attorney—Jones and Lockwood

[57] ABSTRACT

A removable weather deflector for the windshield of an automobile, including a top member and two side members, is disclosed. The top member has an upper horizontal portion, an intermediate downwardly extending curved portion and a lower horizontal portion which acts as a visor to keep rain and snow off the windshield. The two side members are adjustably secured to the top member and can be secured directly to the windshield of the automobile to support the top member.

3 Claims, 8 Drawing Figures

Patented March 21, 1972

INVENTOR
GEORGE A. POWERS
BY Beale and Jones
ATTORNEYS

Patented March 21, 1972

INVENTOR
GEORGE A. POWERS
BY Beale and Jones
ATTORNEYS 3,650,559

WEATHER DEFLECTOR FOR AUTOMOBILE WINDSHIELD

BACKGROUND OF THE INVENTION

This invention relates to a weather deflector for the windshield of an automobile, and more particularly to a removable visor which can be used to prevent snow and rain from obstructing the vision of the automobile occupants when watching a drive-in movie.

One of the major problems with the outdoor or drive-in movie is the automobile occupants' inability to see the theater screen when it is raining or snowing. In rainy weather, the drive-in movie patron has to either keep the windshield wipers of his automobile operating continuously or be constantly turning the windshield wipers on and off to remove the water or snow from the windshield so that he can see the theater screen. The necessity of using the windshield wipers constantly not only is very annoying, but is not good for the automobile battery. If the car is equipped with vacuum operated wipers, the engine must be started each time the wipers are used, creating an additional interruption. However, the drive-in movie patron either has to use the windshield wipers or stay at home during inclement weather.

Although in the past there have been some devices which have been used to deflect rain, snow and sun rays from the automobile windshield, these past devices are primarily for use when the automobile is being driven; therefore, these presently known devices are securely attached to the automobile by brackets, clamps, or the like so they will not be blown off by the wind while the automobile is moving. These deflectors cannot easily be removed when they are not is use, and since many persons object to the appearance of such devices, and are unwilling to have them permanently mounted on their cars, they are not much in use. One of the major reasons why the presently known devices are not used extensively is that it has been found that they can present a safety hazard because they cut down on the driver's field of vision.

From the foregoing, it can be seen that there has existed a need for a weather deflector for a automobile windshield which is lightweight and which can easily be mounted on the windshield and removed therefrom when not in use. Also, a need for a deflector which will permit the occupants of an automobile to view a drive-in theater screen during inclement weather without the necessity of using the automobile windshield wipers has existed.

SUMMARY OF THE INVENTION

It is, therefore, an object of this invention to provide a weather deflector for an automobile windshield which will permit the occupants of the automobile to view a drive-in theater screen during inclement weather.

Another object of this invention is to provide a weather deflector which can be easily mounted on the automobile and easily removable when the deflector is not in use.

Still another object of this invention is to provide a weather deflector which is light, durable, efficient, economical, easy to manufacture, and which will fit virtually any make or model of car.

These and other objects are accomplished by the present invention through the use of a deflector device including a visor member having an upper horizontal portion for contacting the top of a car, an intermediate, downwardly extending, curved portion for engaging the upper edge of the curved surface of the automobile windshield or the windshield molding, and a lower, generally horizontal, visor portion extending out over the windshield for preventing rain or snow from striking the windshield. The visor member is supported by two side members adjustably secured to the ends of the visor, each side member having suction means secured thereto so that the device can be easily mounted directly on the windshield.

BRIEF DESCRIPTION OF THE DRAWINGS

The foregoing and additional objects, features and advantages of the invention will be apparent to those skilled in the art from the following detailed description of a preferred embodiment taken with the accompanying drawings, in which.

DESCRIPTION OF A PREFERRED EMBODIMENT

Figure 1:
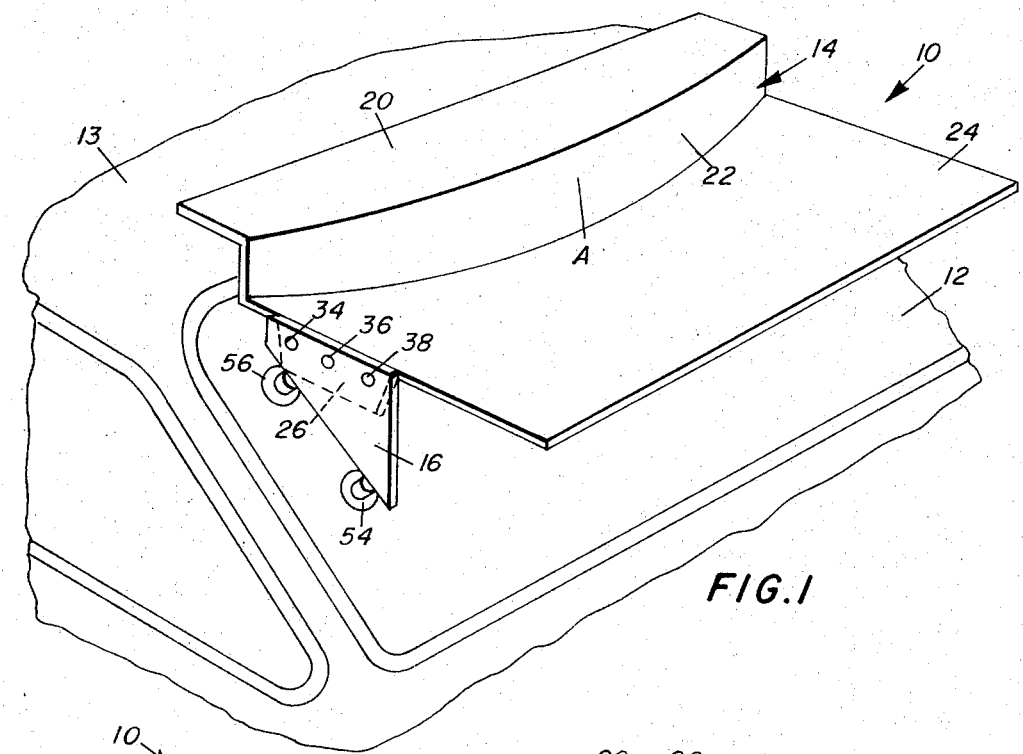
FIG. 1 is a perspective of weather deflector of the present invention mounted on an automobile windshield.

Referring more particularly to the drawings, in FIG. 1, the numeral 10 indicates a weather deflector made in accordance with the present invention, and which is mounted on the windshield 12 of an automobile 13. The weather deflector 10 may be of any desired length and width, and thus may be dimensioned to span the entire width of the automobile. However, such a device would be bulky, difficult to store, and would require that numerous different sizes be manufactured to accommodate different sizes of automobiles. For these reasons, the deflector will normally be smaller than the entire automobile windshield, preferably covering that part of the windshield through which the occupant would view a drive-in movie screen, and because of its simplicity, the weather deflector device may be positioned on the automobile windshield any place the occupant may desire. The deflector will normally be made of a rigid plastic material such as polyethylene, and preferably will be non-transparent to prevent the droplets of water which will form on the deflector from reflecting or diffracting light from the movie screen or other sources into the eyes of the occupants of the automobile while they are watching the movie.

Figure 2:
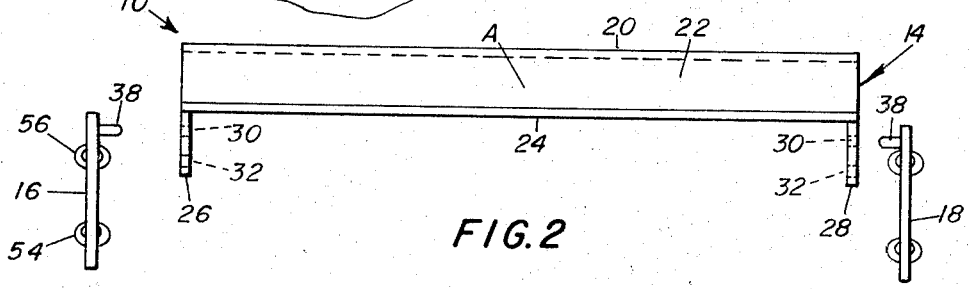
FIG. 2 is an exploded front view showing one embodiment of the weather deflector in accordance with the present invention.
Figure 4:
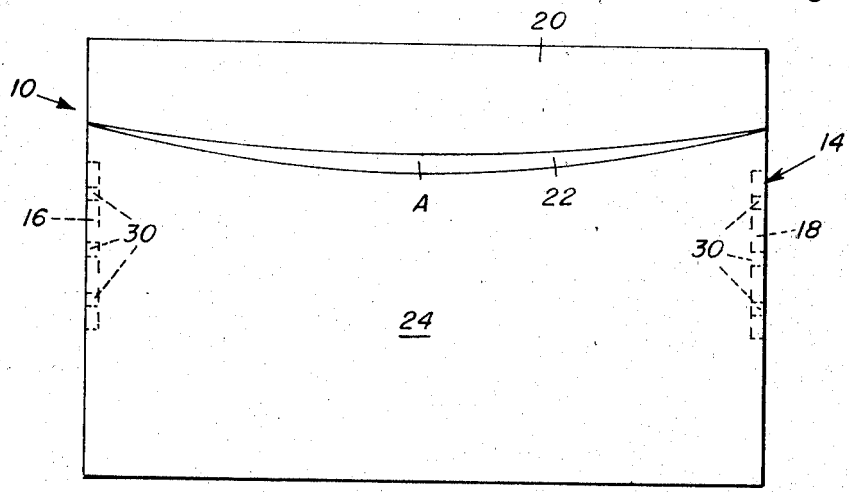
FIG. 4 is a plan view of the weather deflector in accordance with the present invention, with the mounting support members removed.
Figure 3:
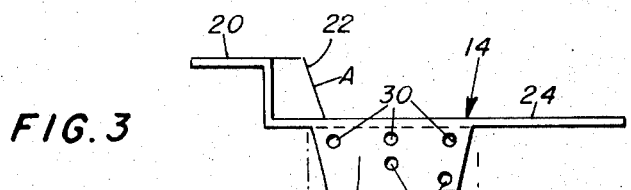
FIG. 3 is a side view taken on line 3—3 of FIG. 2 showing only the visor member of the embodiment of FIG. 2.

Considering the present invention in more detail, it can be seen in FIG. 2 that the weather deflector 10 includes a visor member 14 and two mounting support members 16 and 18. The visor member 14 (see FIGS. 3 and 4) in a preferred form will be approximately twenty-four (24) inches long and fifteen (15) inches wide, overall, although any desired dimensions may be used. However, as noted above, it is considered generally desirable to keep the wind deflector device relatively small so that it can be handled and stored more easily. As shown, the visor member is formed with an upper horizontal section 20 which is approximately three (3) inches wide at each edge of the visor, but curves to a width of approximately three and three-quarter inches (3 ¾) at the midpoint of the section. This upper portion is designed to rest on the roof of the automobile, and to position it above the portion of the windshield which is to be protected.

Integrally formed with the upper horizontal section is a downwardly extending, curved section 22 which may be, for example, approximately two (2) inches in width. The curved section 22 slopes slightly away from the vertical, as indicated at A in FIGS. 3 and 4, so that the curvature and slope of this section will conform to the configuration of the molding usually located at the juncture of the windshield and the roof of the automobile. This structure assures that the deflector device will fit properly and provide weather protection for approximately ninety percent (90 percent) of all presently made standard automobiles.

The remainder of the visor member consists of a lower horizontal section 24, which is integrally formed with the lower edge of the curved section 22, extends outwardly away from section 22, and is generally parallel to the upper horizontal section 20. The lower horizontal portion is approximately twelve (12) inches in width from its edge to the curved portion 22, although the width may vary along the length of the visor in accordance with the curvature of section 22. Although the visor member is generally rectangular, as viewed in FIG. 4, it will be apparent that the design may be varied, as by rounding the corners, etc. Formed integrally with and depending from the side edges of the lower horizontal portion 24 are side flanges 26 and 28. These side flanges have a plurality of holes which are formed in two general rows, an upper row of holes 30, and a lower set of holes 32. These holes are spaced to receive in at least two alternative positions corresponding projections located on the side support members 16 and 18, as will be described, so that the position of the visor member may be adjusted.

Figure 5:
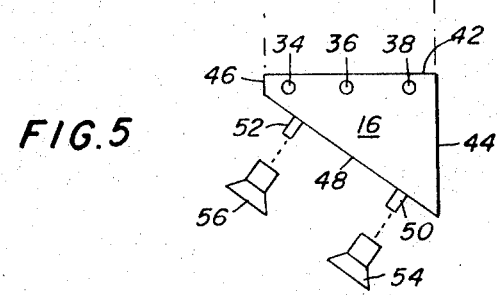
FIG. 5 is a side view taken on line 5—5 of FIG. 2, showing a side support member of the embodiment shown in FIG. 2.

As illustrated in FIGS. 2 and 5, the visor member 14 is secured to the generally triangular mounting support members 16 and 18 by a plurality of fasteners which may be suitable nuts and bolts, if desired, but preferably will be a series of projections 34, 36, 38 molded as a part of the plastic support members. These projections are located near the top edge of the mounting support arms 16 and 18, and adapted to snap into holes 30, 32 on the side flanges 26 and 28. The projections may be tapered or otherwise shaped to provide a firm, but removable, fit in the side flange holes, whereby the deflector visor will be held securely in place. It will be seen that the projections, or pins, may be placed in the upper or lower row of holes 30 or 32 in the side flanges of the visor member to vary the angular relationship of the visor and the mounting support members 16 and 18. In a specific embodiment of the present device, it was found that a suitable support member is approximately size (6) inches across top edge 42 (FIG. 5), approximately five and one-half (5 ½) inches along forward edge 44, and approximately one (1) inch along rear edge 46. The diagonal lower edge 48 formed between the front and rear edges is approximately six (6) inches in length. Formed integrally with the diagonal edge 48 of each mounting support member are spaced posts 50 and 52 which are adapted to receive suction devices 54 and 56, respectively, such as ordinary rubber suction cups. The suction devices are secured to the posts 50 and 52 by any suitable means such as gluing or the like, and serve to position and hold the support members on the windshield.

Figure 6:
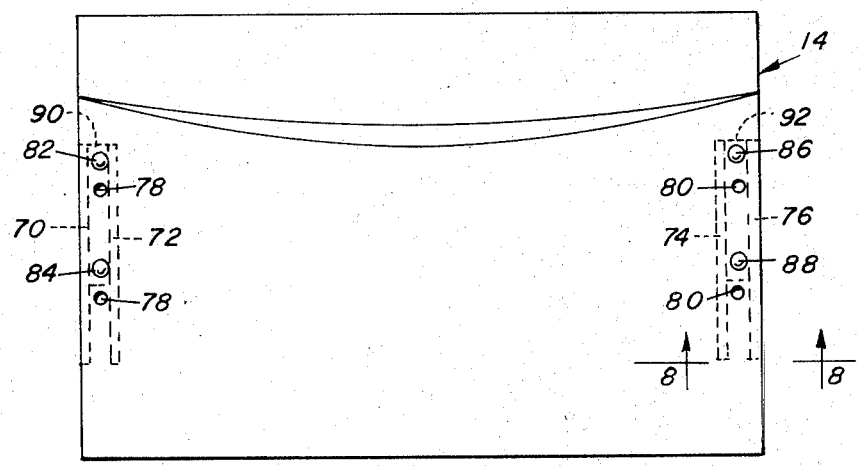
FIG. 6 is a plan view of the weather deflector in accordance with the present invention, showing an alternative means for securing the visor member to the support members.
Figure 7:
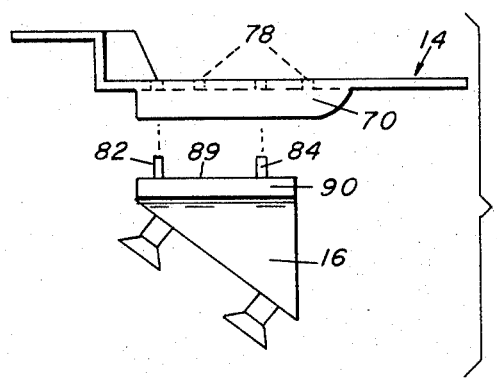
FIG. 7 is an exploded side view taken on line 7—7 of FIG. 6, showing the alternative embodiment of the weather deflector in accordance with the present invention.
Figure 8:
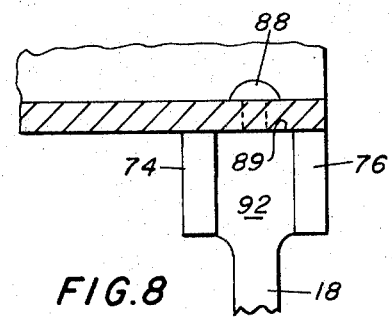
FIG. 8 is a cross sectional view taken on line 8—8 of FIG. 6, showing the joint between the visor member and one of the side support members.

Another means for securing the visor member 14 to the triangular mounting supports 16 and 18 is illustrated in FIGS. 6, 7 and 8. A pair of depending spaced flanges 70 and 72 and 74 and 76 are molded integrally with the lower horizontal portion 24 of the visor. These flanges are located contiguous to and parallel to the sides of the lower horizontal portion 24 of the visor member 14. The visor member is formed with a row of holes 78 and 80 parallel to its sides and disposed between the depending flanges 70, 72 and 74, 76, respectively. The holes in each row are spaced to receive at least two correspondingly spaced projections 82, 84 and 86, 88 molded as part of the support members and located on the top edges 42 and 89 of side support members 16 and 18, respectively. In this modified embodiment, the top side of each of the support members 16 and 18 has an enlarged portion, at 90 and 92, as illustrated in FIG. 8, which will fit snugly between the depending flanges 70, 72 and 74, 76, respectively. The projections 82, 84, 86 and 88 may be shaped similarly to projections 34, 36 and 38, as described above, or in any other suitable manner, in order to provide a firm, but removable, fit in the holes 78 and 80. The projections may be snapped into selected ones of the corresponding holes so that the position of the visor member 14 may be adjusted.

To mount the deflector device on an automobile, the side support members 16 and 18 and visor member 14 are secured together by snapping the projections on the support members into the appropriate holes on the corresponding side flanges 26 and 28 or between the depending flanges 70, 72 or 74, 76. This arrangement allows the angle between the horizontal portion 28 and the edge 48 of the support (which corresponds to the windshield) to be varied, thus permitting the visor member to be tilted and adjusted so the deflector device will extend out over the windshield of the automobile at the desired angle. When the deflector and supports are in the desired angular relationship, the deflector device is then secured to the windshield by the suction devices on the mounting support members. The suction members permit the deflector device to be mounted and removed from the windshield with relative ease and to be positioned where required for proper vision. The deflector is positioned so that portion 20 extends over the roof to the car and portion 22 rests on, and follows the contour of the windshield molding, whereby rainwater falling on the forward edge of the roof will not run down under the deflector onto the windshield. The main portion of the visor 24 extends over the windshield to protect it from falling rain and snow.

It can be seen from the above description and drawings that the weather deflector device construction of the present invention provides a lightweight, easily handled removable visor which can be used to deflect rain and snow from the windshield of an automobile to permit the occupants of the automobile unobstructed vision of a drive-in movie screen, and the deflector device can easily be removed when not in use. The device also is a durable, efficient, economical and easy to manufacture device which can be used on all types of automobiles.

The described embodiment can be modified in numerous ways as will be apparent from the foregoing. For example, it is within the skill of the art to vary the material from which the device is made, to modify the method of adjusting the visor member with respect to the side support members, and to adjust the overall dimensions of the deflector device. However, these and other variations and changes can be made in the invention as above described and illustrated without departing from the true spirit and scope thereof as defined in the following claims.

What is claimed is:

1. A plastic weather deflector for use with the windshield of an automobile during inclement weather so that the occupants of the automobile can view a drive-in movie screen during rainy and snowy weather comprising:

a. a visor member having a first, lower, horizontal portion, a second, upper, horizontal portion and a curved portion which conforms to the contour of the automobile at the juncture between the automobile windshield and the automobile roof, said first horizontal portion being formed integrally with said curved portion and adapted to extend outwardly over the automobile windshield, said second horizontal portion integrally formed with said curved portion and adapted to extend over the automobile roof, said curved portion sloping downwardly from the forward edge of said second horizontal portion to the rear edge of said first horizontal portion to permit said second horizontal portion to rest on the roof of said automobile, said curved portion to rest on the molding joining said windshield and roof, and said first horizontal portion to protect said windshield;

b. first and second support members secured to corresponding sides of said visor member for mounting said deflector device on the vehicle, said support members having suction means to permit the deflector to be attached directly to the windshield of the automobile; and c. means for selectively adjusting the relative position of the visor member and the support members so that the deflector will fit numerous types of vehicles.

2. The device of claim 1, wherein said means for selectively adjusting the relative position of the visor member includes first and second side flanges depending from and integrally formed with said visor member, each said side flange having a plurality of holes, and a plurality of inwardly extending protrusions on each of said support members and adapted to snap into selected holes on corresponding side flanges.

3. The device of claim 1, wherein said means for selectively adjusting the relative position of the visor member includes first and second pairs of spaced, parallel flanges depending from and integrally formed with said visor member, one pair of flanges being contiguous to each side of said visor member, said visor member having a row of holes located between each of said pairs of flanges, fastener means for each support member adapted to be received by selected holes in corresponding sides of said visor member for connecting said support members to said visor member.

* * * * *